(12) United States Patent
Hills (10) Patent No.: US 7,510,661 B2
(45) Date of Patent: Mar. 31, 2009

(54) SEPARATION SYSTEM FOR THE REMOVAL OF FAT, OIL OR GREASE FROM WASTEWATER

(76) Inventor: Blair H. Hills, 1648 Woodvale Dr., Charleston, WV (US) 25314

( * ) Notice: Subject to any disclaimer, the term of this patent is extended or adjusted under 35 U.S.C. 154(b) by 531 days.

(21) Appl. No.: 11/121,778

(22) Filed: May 4, 2005

(65) Prior Publication Data

US 2005/0247647 A1 Nov. 10, 2005

Related U.S. Application Data

(60) Provisional application No. 60/567,879, filed on May 4, 2004.

(51) Int. Cl.
*B01D 17/032* (2006.01)
*B01D 35/18* (2006.01)
*C02F 1/38* (2006.01)

(52) U.S. Cl. .................. 210/767; 210/173; 210/175; 210/195.1; 210/241; 210/360.1; 210/380.1; 210/512.3

(58) Field of Classification Search .......... 210/767, 210/173, 175, 195.1, 241, 360.1, 380.1, 512.1, 210/512.3, DIG. 8; 494/37, 53, 70; 142/82; 141/82
See application file for complete search history.

(56) References Cited

U.S. PATENT DOCUMENTS

| | | | |
|---|---|---|---|
| 1,831,473 A * | 11/1931 | Adams | 210/512.3 |
| 3,648,840 A * | 3/1972 | Bobo | 494/56 |
| 4,360,046 A | 11/1982 | Streit et al. | |
| 5,098,584 A | 3/1992 | Leen | |
| 5,225,085 A | 7/1993 | Napier et al. | |
| 5,229,014 A * | 7/1993 | Collins | 210/512.3 |
| 5,453,187 A * | 9/1995 | Plumb | 210/202 |
| 5,591,340 A * | 1/1997 | Meikrantz et al. | 210/512.3 |
| 5,637,233 A * | 6/1997 | Earrusso | 210/767 |
| 5,916,491 A | 6/1999 | Hills | |
| 5,925,290 A | 7/1999 | Hills | |
| 5,948,373 A | 9/1999 | Guy et al. | |
| 6,036,871 A | 3/2000 | Eichler | |
| 6,135,430 A | 10/2000 | Bergman, Jr. et al. | |
| 6,145,815 A | 11/2000 | Cheng et al. | |
| 6,168,723 B1 * | 1/2001 | Moody | 210/774 |
| 6,273,402 B1 | 8/2001 | Cheng | |
| 6,315,903 B1 | 11/2001 | Noyes | |

\* cited by examiner

*Primary Examiner*—David A Reifsnyder
(74) *Attorney, Agent, or Firm*—Alan G. Towner, Esq.; Robert P. Lenart, Esq.; Pietragallo Gordon Alfano Bosick & Raspanti, LLP (57) ABSTRACT

A wastewater separation system for separating an aqueous phase from an organic phase comprising oil, fat and/or grease in wastewater is disclosed. The wastewater may be collected from restaurant grease traps, as well as other food preparation facilities, schools, hospitals, processing plants and the like. A separator, such as a centrifugal separation device, comprises a wastewater inlet, an organic phase outlet for discharging low density liquid and solids and an aqueous phase outlet for discharging water and possibly other high density liquids and solids. The system can be portable and can be mounted on a vehicle for collection and treatment at various sites. Heat can be introduced to the system to accelerate the separation of the aqueous phase from the organic phase of the wastewater.

16 Claims, 6 Drawing Sheets

SEPARATION SYSTEM FOR THE REMOVAL OF FAT, OIL OR GREASE FROM WASTEWATER

CROSS REFERENCE TO RELATED APPLICATIONS

This application claims the benefit of U.S. Provisional Patent Application Ser. No. 60/567,879 filed May 4, 2004, which is incorporated herein by reference.

FIELD OF THE INVENTION

The present invention relates generally to the separation devices, and more particularly relates to systems for separating the aqueous phase from the organic phase of wastewater.

BACKGROUND INFORMATION

Wastewater or "gray water" from food preparation facilities typically comprises grease, oil, fat and surfactants, collectively the "organic phase", and water which may also contain food solids, the "aqueous phase". The aqueous phase of wastewater can be easily passed through wastewater piping and treated by wastewater treatment systems, however, if the organic phase is allowed to enter sewer lines and wastewater treatment systems, it can form blockages in the wastewater piping, primary treatment systems, publicly owned treatment works (POTWs) and leach fields.

To reduce this problem and capture the organic phase before it enters wastewater collection and treatment piping, grease traps have traditionally been used in food preparation and processing facilities, such as restaurants, schools, hospitals, processing plants and the like. Grease traps are large cavities or tanks in wastewater piping systems that collect the organic phase, which is typically mixed with the aqueous phase, as it leaves the food preparation facilities but before the wastewater enters a wastewater treatment system. Grease traps allow the organic phase to separate out of The aqueous phase and float to the surface where the organic phase can be held or trapped until it can be collected and disposed.

The organic phase has a specific gravity that is less than the specific gravity of water. Accordingly, given sufficient time, the organic phase will float on the aqueous phase. When the organic phase is collected in a grease trap, some of the organic phase will be in or on substances that have a higher specific gravity. This can cause some of the organic phase to be suspended in the wastewater as suspended solids. Accordingly, the organic phase cannot simply be skimmed off the surface of the aqueous phase present in the grease trap. In addition, the cleaning of a grease trap causes violent mixing of the organic phase and the aqueous phase thereby distributing the organic phase throughout the aqueous phase. When the aqueous phase layer is pumped through the organic phase layer by the disposal truck, the aqueous phase and the organic phase are violently mixed to form organic/aqueous emulsions in the aqueous phase. Accordingly, the aqueous phase cannot simply be disposed of into the sewer lines due to the organic phase contained in the emulsions dispersed throughout the aqueous phase.

The size of the grease trap can vary depending on the amount of wastewater that passes through the trap and the amount of organic phase present in the wastewater. However, the grease traps used in typical food preparation facilities can be from about 1,000 to 2,000 gallons or more. Typically, the organic phase comprises only 10 to 50 percent of the total volume of the grease trap at the time of cleaning while the aqueous phase accounts for 50 to 90 percent of the volume of the grease trap. As such, a significant amount of the waste liquids and solids transported to the disposal site is the aqueous phase, and the hydrophilic solids residing in the aqueous phase, even though the aqueous phase does not pose any concerns to wastewater treatment systems if the organic/aqueous emulsions can be eliminated from it. Accordingly, traditional systems significantly increase the transportation costs and the energy required in typical disposal processes.

The present invention has been developed in view of the foregoing and to remedy other deficiencies of the prior art.

SUMMARY OF THE INVENTION

The present invention relates to a separation system for separating the aqueous phase from the organic phase of wastewater that is typically collected from grease traps and the like. A separator, such as a centrifugal separation device, comprises a wastewater inlet, an organic phase outlet for discharging separated organic phase material, and an aqueous phase outlet for discharging separated aqueous phase material. The system can be portable and can be mounted on a vehicle for collection and treatment at various sites. Heat can be introduced to the system to accelerate the separation of the aqueous phase from the organic phase of the wastewater.

An aspect of the present invention is to provide a system for separating an aqueous phase from an organic phase comprising oil, fat and/or grease in wastewater, the system comprising a wastewater container, and a separator comprising a wastewater inlet in fluid communication with the wastewater container, an aqueous phase outlet for concentrating at least some of the aqueous phase from the wastewater, and an organic phase outlet for concentrating at least some of the organic phase from the wastewater.

Another aspect of the present invention is to provide a portable system for separating an aqueous phase from an organic phase comprising oil, fat and/or grease in wastewater, the system comprising a portable separator having a wastewater inlet, an aqueous phase outlet for concentrating at least some of the aqueous phase from the wastewater, and an organic phase outlet for concentrating at least some of the organic phase from the wastewater.

Another aspect of the present invention is to provide a system for separating an aqueous phase from an organic phase comprising oil, fat and/or grease in wastewater, the system comprising a separator having a wastewater inlet, an aqueous phase outlet for concentrating at least some of the aqueous phase from the wastewater, and an organic phase outlet for concentrating at least some of the organic phase from the wastewater, and means for heating the wastewater prior to introducing the wastewater into the separator.

A further aspect of the present invention is to provide a method for separating an aqueous phase from an organic phase comprising oil, fat and/or grease in wastewater, the method comprising providing the wastewater to a separator, concentrating at least a portion of the aqueous phase to produce a concentrated aqueous phase, concentrating at least a portion of the organic phase to produce a concentrated organic phase, removing at least a portion of the concentrated aqueous phase from the separator, and removing at least a portion of the concentrated organic phase from the separator.

These and other aspects of the present invention will be more apparent from the following description.

DETAILED DESCRIPTION

The present invention provides a separation system for wastewater mixtures. As used herein, the term "wastewater" means a mixture comprising an aqueous phase and an organic phase from sources such as food preparation and processing facilities, such as restaurants, schools, hospitals, processing plants and the like. Wastewater may optionally include emulsions of organic phase and aqueous phase that incorporate gases, such as methane and carbon dioxide formed due to anaerobic digestion. The term "aqueous phase" means water and/or water substantially free of hydrophobic solids. The term "organic phase" means lipids such as greases, oils, fats and/or soaps which may be suspended in the aqueous phase of the wastewater.

Figure 1:
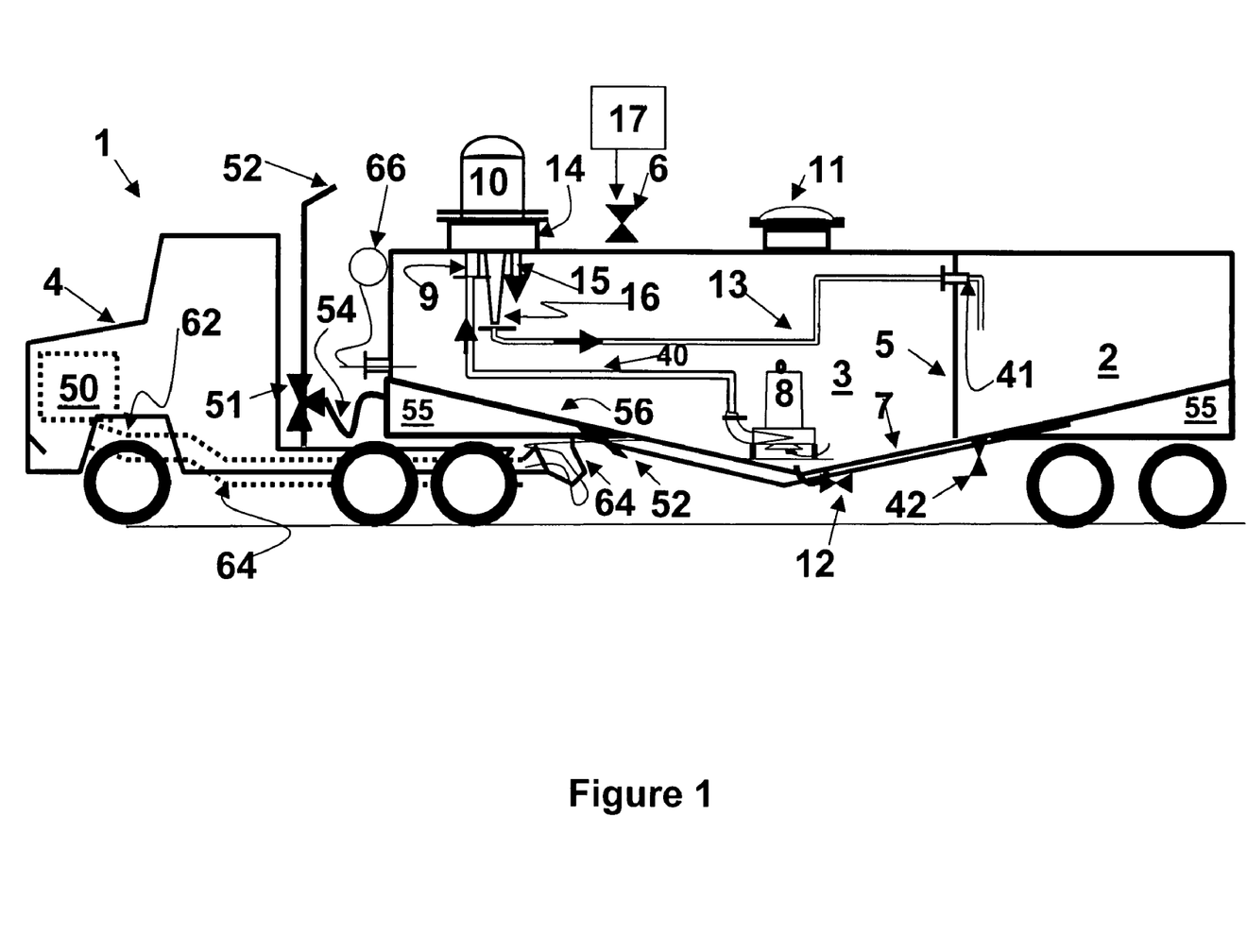
FIG. 1 is a partially schematic side sectional view of a portable wastewater separation system in accordance with an embodiment of the present invention.

As shown in FIG. 1, a separation apparatus 1 comprises a container for housing wastewater having two isolated tank compartments 2 and 3 housed on, or integral with, a moveable device 4, such as a skid, vehicle and/or trailer. In the embodiment shown in FIG. 1, the vehicle is a truck. The system can be portable and driven to various sites for collection and treatment of wastewater. As shown in FIG. 1, the two isolated tank compartments 2 and 3 can comprise two separate tanks or a single tank that is partitioned. A single tank can be partitioned by placing a partition wall 5 in the tank, such as a bulkhead wall, that can create two distinct regions, or by placing a flexible bladder within the tank, thereby creating two watertight compartments. One of the tank regions is a mixed organic/aqueous compartment 3 that is capable of receiving wastewater from a wastewater source 17 comprising both organic phase and aqueous phase constituents and/or solids and/or emulsions of these constituents through a liquid inlet valve 6. In one embodiment, wastewater from grease traps can be conveyed from the wastewater source 17 through the inlet valve 6 into the mixed organic/aqueous compartment 3 by gravity feed or by a conveying device such as a vacuum blower, a self priming pump, and/or a submersible pump positioned within the grease trap, or by an air lift pump that is mounted in a conveying tube or hose that is connected in fluid communication to the mixed organic/aqueous compartment 3.

The mixed organic/aqueous compartment 3 can comprise any desired shape. In one embodiment, the mixed organic/aqueous compartment 3 comprises a tank having a tapered bottom 7 inclined down toward at least one liquid outlet or drain 12. In one embodiment, the liquid outlet 12 is a dip pipe having an entrance located near the bottom of the mixed organic/aqueous compartment 3 and an outlet near the top of the compartment 3. At least one wastewater pump 8, such as a submersible grinder pump or a pump that includes a screening device for preventing large objects from entering the pump, is positioned near the bottom of the mixed organic/aqueous compartment 3. The pump 8 generates suction from an area near the bottom of the mixed organic/aqueous compartment 3 and pumps the wastewater to the inlet of a separator 10 via a pipe 40. The pump 8 may reduce the size of objects such as large pieces of food articles, paper trash, and plastic utensils that are passed into grease traps by the wastewater. In one embodiment, the pump 8 can be powered by electricity, hydraulic fluid, compressed air, or by direct connection to the separator 10 as described herein. Typically, the pump 8 will have a motor having a horsepower of from about 1 hp to about 30 hp and has dimensions such that the pump 8 is capable of fitting through a tank opening 11 or manway. The submersible pump 8 can move any suitable volume of liquid/minute, such as from about 10 to about 300 gallons/minute.

The separator 10 can be positioned at any location within the system provided it is in flow communication with the wastewater. For example, the separator 10 may be mounted on, or adjacent to, the mixed organic/aqueous compartment 3. The separator 10 includes a wastewater inlet 9, an organic phase outlet 15, and an aqueous phase outlet 16. Separators, such as centrifugal separators, can include solid bowl decanting centrifuges, solid bowl scroll centrifuges, solid bowl disc stack centrifuges, hydrocyclones and motorized hydrocyclones. The separator 10 can be powered by, e.g., an electric motor, hydraulic fluid, compressed air or a vehicle power takeoff device. The separator 10 can be fully submersed within the contents of the mixed organic/aqueous compartment 3, partially submersed within the contents of the compartment 3, such as located within a manway opening 14, submersed in the contents of the separated aqueous compartment 2, or positioned externally from compartments 2 and 3 but in fluid communication with the wastewater. In one embodiment, the portion of the separator 10 that is not submersed in the mixed organic/aqueous compartment 3 can be housed in a pressure vessel that is sealed around the manway opening 11 or 14. In many embodiments only one separator 10 will be used, however, multiple separators 10, such as centrifugal separation devices could be employed.

Figure 2:
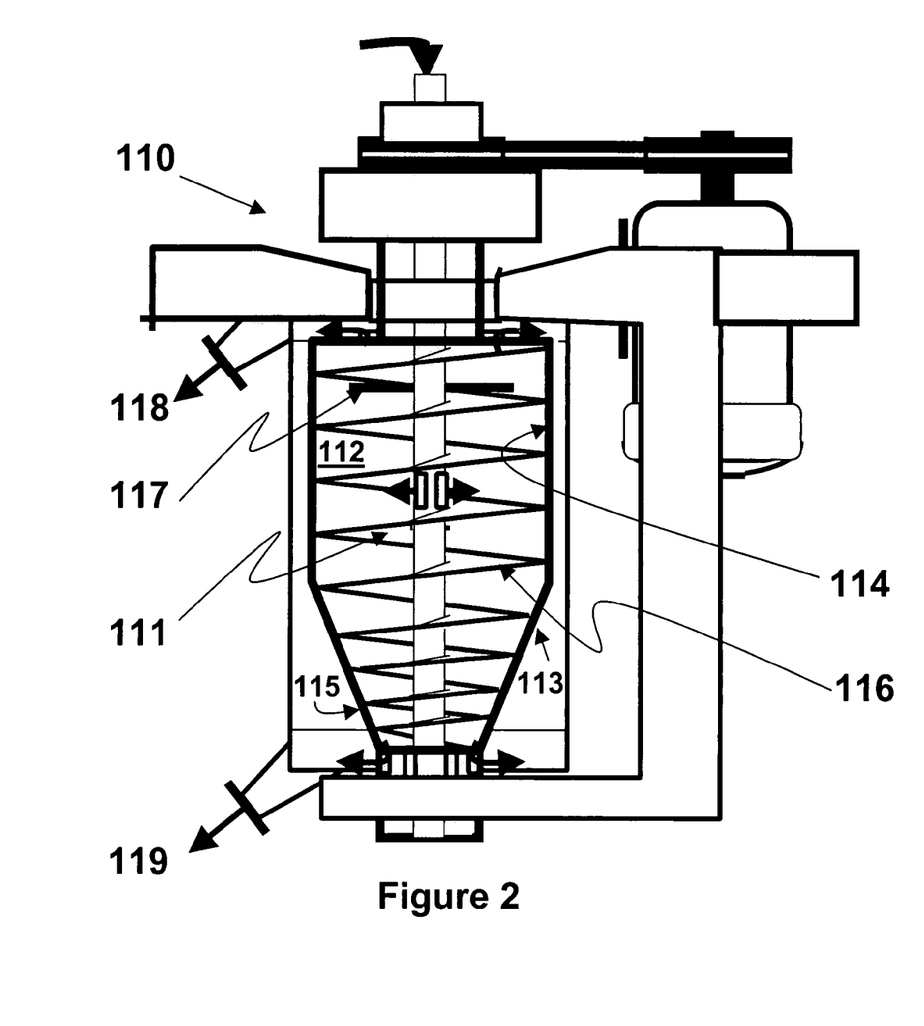
FIG. 2 is a partially schematic side sectional view of a centrifugal separator in accordance with an embodiment of the present invention.

In one embodiment, the separator 10 is a solid bowl centrifuge such as a mechanically coupled solid bowl decanting centrifuge 110 as shown in FIG. 2. In this embodiment, wastewater comprising both an aqueous phase and an organic phase is fed into a rapidly rotating solid bowl centrifuge with a helical screw 111 positioned within the interior 112 of the apparatus. The helical screw 111 typically rotates at a speed of from about 1,000 rpm to about 4,000 rpm and is surrounded by an outer bowl casing 113, which rotates at a slower speed than the helical screw 111, typically from about 960 rpm to about 3960 rpm. Due to the differences in the rotational speeds of the helical screw 111 and the bowl casing 113, denser solids and liquids are forced to the interior wall 114 of the bowl casing 113. The denser solids and can be extracted from the aqueous phase by conveying the dense solids along a conical beach 115 which compacts the denser solids as the blades 116 of the helical screw 111 turn in a direction causing denser solids to travel against the inward grade of the conical beach 115 thereby removing them with the lighter liquid phase. Heavy aqueous phase material is directed to a first outlet 118 and lighter organic phase material and aqueous solids are directed to a second outlet 119.

The aqueous phase of the wastewater is separated from the organic phase, which is prohibited from exiting with the aqueous phase by a circular weir 117 affixed normal to the rotating helical screw 111. This allows the aqueous phase to travel out the conical beach 115 as the helical screw 111 is rotated. The solid bowl centrifuge is typically capable of treating from about 10 to about 300 gallons of liquid per minute and has a horsepower of from about 25 to about 75 hp. The solid bowl centrifuge can be a decanting type, disc stack type, scroll type or a nozzle discharge continuous type.

The dimensions and power rating of the solid bowl centrifuge are selected according to the amount of wastewater that will be processed by the solid bowl centrifuge. In one embodiment, the solid bowl centrifuge can be mounted so that the rotation is about a vertical axis. This can be preferred because it prevents large bearing loads and premature damage to the high speed rotational machine when the tank or truck the tank is mounted on makes a sharp turn.

The solid bowl centrifuge can have a continuous solids discharge or a discontinuous solids discharge. Typically, in continuous solids discharge operations, the organic phase is kept from discharging with the aqueous phase by a weir plate. The lower-density organic phase is discharged from the centrifuge by either a skimming device, for example a circular plate or a plurality of arms affixed to the rotating shaft, or along with collected solids at the end of the beach. The organic phase is either recycled back to the mixed organic/aqueous container or is diverted to a proper disposal site.

Figure 3:
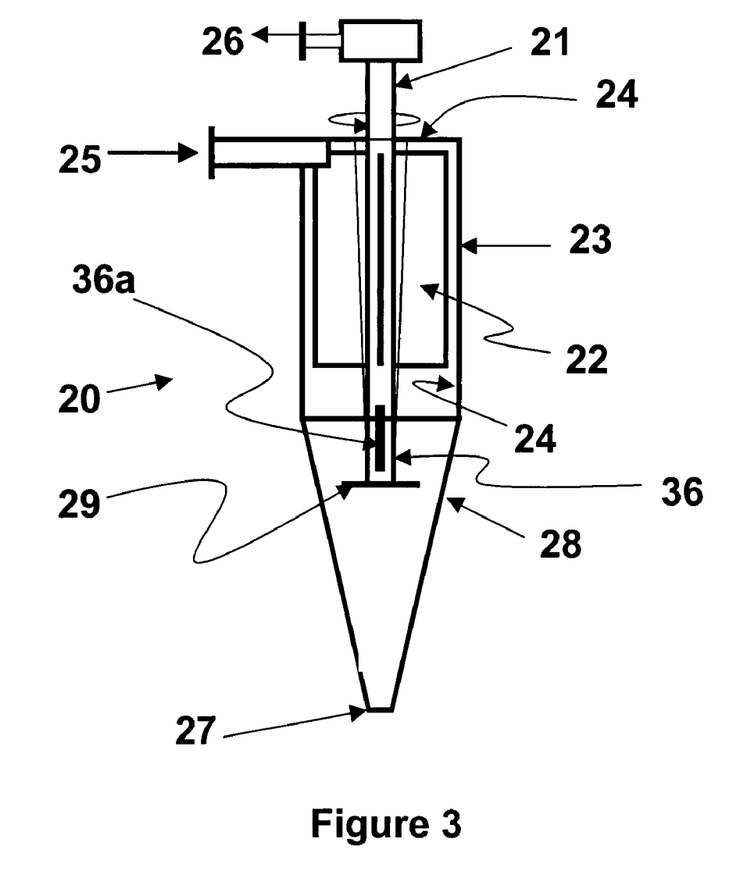
FIG. 3 is a partially schematic side sectional view of a centrifugal separator in accordance with another embodiment of the present invention.
Figure 4:
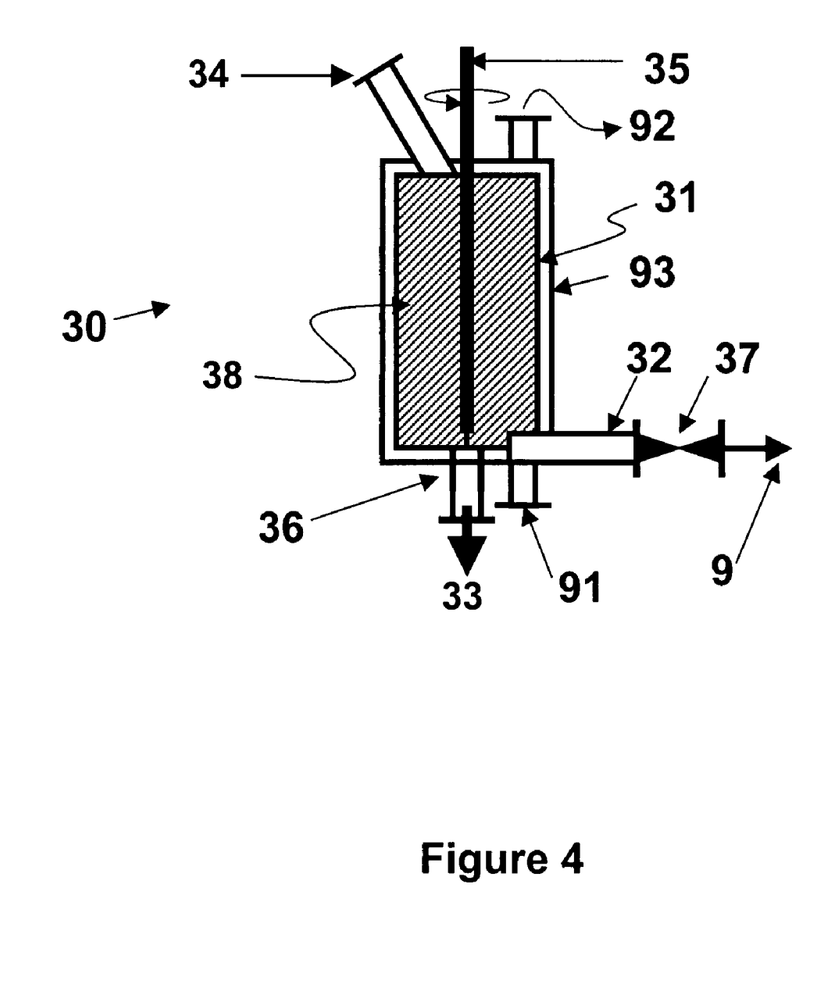
FIG. 4 is a partially schematic side sectional view of a centrifugal separation device in accordance with a further embodiment of the present invention.

Alternatively, the separator 10 can comprise a centrifugal separation device such as a hydrocyclone or a motorized hydrocyclone as shown in FIGS. 3 and 4. As used herein, the term "motorized hydrocyclone" means any hydrocyclone that is mechanically driven. For example, a drive shaft of the motorized hydrocyclone can be powered by any suitable power, either externally or internally to the separator. Hydrocyclones allow for the separation of liquids having varying densities by creating a high angular velocity in a helical pathway for the liquids within the interior of a cyclone. The interior of the cyclone can comprise a cylindrical inlet section that leads into a truncated cone shaped area that comes to a narrowed section having a reduced cross sectional area that is open to allow liquids and solids to exit. Typically, the wastewater to be separated is tangentially introduced to the hydrocyclone under pressure at its perimeter, thereby forming a vortex that moves helically within the interior of the cyclone. The wastewater is introduced into the hydrocyclone at a high velocity caused by a restriction in the inlet nozzle. The high angular velocity spins the contents of the hydrocyclone, causing them to experience angular acceleration. This creates higher than gravitational forces on the liquid/liquid, liquid/solid, gas/liquid/liquid or gas/liquid/liquid/solid mixture. Rapid acceleration of the mixture can cause encapsulated pockets of gas, such as methane and carbon dioxide produced by anaerobic digestion, to break apart and separated from the mixture. Rapid acceleration of the mixture also causes the highest density liquids and/or solids gravitate to the outside wall and the lower density fluid moves to the center of the cavity of the cyclone. The higher density liquids and solids form a helical path as they move away from the inlet towards a perimeter outlet. The lower density liquids initially move axially with the high density components, then form a counter-current helical path as they move from the inlet to the center outlet where they are discharged at low pressures. The low density outlet located at the center of the cylindrical hydrocyclone and is often located within the hydrocyclone by using a dip pipe or a vortex finder. The tangential angular velocity and angular acceleration of the higher density liquids and solids increases as the cyclone radius decreases, thereby creating a maximum centrifugal acceleration at the area of reduced cross section. The lower density solids and liquids of the organic phase are directed to a first outlet nozzle that is located at the center of the hydrocyclone. The higher density solids and aqueous phase liquid are directed to a second outlet nozzle that is located at the perimeter of the hydrocyclone.

As shown in FIG. 3, a motorized hydrocyclone 20 can be used to rapidly spin the wastewater and separate the inlet wastewater into the aqueous phase and the organic phase in accordance with an embodiment of the present invention. A motorized hydrocyclone 20 comprises a mechanically driven shaft 21 that passes into a cylindrical enclosure 23 through an end plate 24 normal to the axis of the enclosure, and supports and drives a plurality of blades 22. Inside the enclosure 23, a plurality of radial blades 22 or vanes are affixed to the shaft 21 located within the center axis of the hydrocyclone 20. When the shaft 21 is rotated, it accelerates the fluids and solids within the enclosure and overcomes the wall friction of the fluids and solids at they are pressed against the interior wall of the enclosure 23 in their helical path to an outlet 26 or 27 some distance axially from the inlet. The applied G forces inside the motorized hydrocyclone 20 are increased, as compared to that of traditional hydrocyclones, thereby increasing the speed at which the higher density phases can be separated from the lighter density phases. The drive shaft 21 can extend the full length of the hydrocyclone 20 and the radial vanes 22 can be tapered to accommodate the varying cross sectional interior of the hydrocyclone 20. Vanes 22 similar to those used in liquid ring vacuum pumps or vortex style pumps can effectively circulate the contents of the hydrocyclone at high angular velocities.

As shown in FIG. 3, the wastewater inlet 25 is positioned tangent to the cylindrical enclosure 23 near the top of the hydrocyclone 20 to allow the wastewater to enter the motorized hydrocyclone 20 in a direction that is substantially tangent to and in the direction of the rotating vanes 22 within the hydrocyclone 20. An organic outlet 26 for allowing low density fluids and solids to exit the motorized hydrocyclone 20 is located near the shaft 21 at the top of the hydrocyclone 20. In one embodiment, the organic phase outlet 26 can comprise ports machined into the housing of the motorized hydrocyclone 20. An aqueous phase outlet 27 for allowing water and any other high density fluids and solids to exit the motorized hydrocyclone 20 can be located at the bottom of the hydrocyclone 20. The aqueous phase outlet 27 can be located at the end of a truncated conical section 28 of the hydrocyclone 20.

In one embodiment, a circular weir plate 29 can be affixed to the center of the shaft 21 proximate to the aqueous phase outlet 27. Weir plate(s) 29 can be sized to have any dimensions such that it will prevent the low density fluids and solids from exiting through the second outlet with the high density fluids and solids. Weir plate(s) 29 can also be configured to accelerate fluids that have a reduced velocity due to friction with the hydrocyclone 20. The diameter of the weir plate 29 can be less than the internal diameter of the motorized hydrocyclone 20 but large enough to effectively transmit angular acceleration to the fluids and form a barrier between the separated organic phase and the aqueous phase to prevent the lower density phase from traveling to the distal end. In one embodiment, a motorized hydrocyclone 20 having an internal diameter of from about 0.05 meters to about 0.6 meters and will comprise a weir plate having a diameter of from about 0.03 meters to about 0.45 meters. In another embodiment, the weir plate 29 can be positioned in the near proximity of the aqueous phase outlet 27 and held stationary with respect to the rotating shaft 21.

The organic phase outlet 26 can also communicate with a rotating vortex finder 36 whose discharge ports 36a in the hollow shaft 21 are located toward the distal end. The rotating vortex finder 36 is located within the interior of the hydrocyclone 20, about the longitudinal axis, to prevent the wastewater entering the hydrocyclone 20 though the wastewater inlet 25 from disrupting the stationary formation of a low density layer of organic phase and a high density layer of aqueous phase. The rotating vortex finder 36 can be a hollow cylinder allowing the lower density fluid to exit through the center of a hollow shaft that mechanically drives the rotating vanes 22. The rotating vortex finder 36 can comprise an open ended tube or large perforations toward the proximal end to allow the low density phase to pass through the shaft interior and be directed to the aqueous phase outlet 27. In one embodiment, the rotating vortex finder 36 is a hollow shaft having blades attached thereto. The diameter of the rotating vortex finder 36 is typically from about 3% to about 20% the diameter of the interior of the motorized hydrocyclone 20.

In one embodiment, as shown in FIG. 3, the motorized hydrocyclone 20 can comprise a cylindrical section 23 which transitions into a conical section 28 with a truncated open end. In another embodiment, as shown in FIG. 4, the motorized hydrocyclone 30 can comprise a cylindrical section 31 with no conical section. In this embodiment, the aqueous phase outlet 32 is located near the bottom of the hydrocyclone cylinder 31 and the opening of the aqueous phase outlet 32 is positioned at the perimeter of the hydrocyclone 30 such that the amount of low density fluids of the organic phase and solids exiting the aqueous phase outlet 32 with the high density fluids and solids is minimized.

As shown in FIG. 4, the motorized hydrocyclone 30 can comprise an organic phase outlet 33 for discharging low density fluids, solids and/or gases to exit the motorized hydrocyclone 30 and an aqueous phase outlet 32 for allowing high density fluids and solids to exit the motorized hydrocyclone 30 that are located near the bottom of the hydrocyclone 30. The organic phase outlet 33 can be located at the center of the hydrocyclone, opposite from the wastewater inlet 34 and concentric to the shaft 35. The organic phase outlet 33 can also comprise a rotating vortex finder 36 with a hollow shaft as discussed above in FIG. 3.

As shown in FIG. 4, the aqueous phase outlet 32 can also be located near the bottom of the hydrocyclone 30, however, the aqueous phase outlet 32 is positioned at the perimeter and tangent of the wall of the interior of the hydrocyclone 30. A flow restriction device 37 can be positioned within or adjacent the aqueous phase outlet 32 to maintain the liquid level inside the hydrocyclone 30 and to allow the low density liquids and solids to exit through the organic phase outlet 33 from the center of the hydrocyclone 30. Variable flow restriction devices can include orifices, venturi systems, valves, variable pitched helical inserts and variable speed screws having a close fit with a pipe diameter of the aqueous phase outlet 32. The aqueous phase outlet 32 can also comprise a fixed flow restriction device 37. The amount of wastewater present in the motorized hydrocyclone 30 can be maintained by controlling the rotational speed of a centrifugal pump feeding the hydrocyclone and/or the rotational speed of the motorized hydrocyclone's vanes 38, either can be varied to maintain a preset pressure.

A motorized hydrocyclone 20 or 30 can be used to achieve increased angular velocity of the fluid as compared to traditional pumping arrangements and non-motorized hydrocyclones. An advantage of using a motorized hydrocyclone as the centrifugal separation device 10 is that the volumetric capacity and the increased forces in the gravitational direction are higher than those observed in other conventional hydrocyclone devices of equal diameter, and especially in those devices having diameters greater than 50 mm. Traditional hydrocyclones typically must have small diameters with reduced inlet and outlet openings to achieve high gravitational forces. Accordingly, traditional hydrocyclones can be prone to solids blockages, erosion and high maintenance. Another advantage of using a motorized hydrocyclone 20 or 30 as the centrifugal separation device 10 is that it improves the solids separation and attrition of food solids. Another advantage of using a motorized hydrocyclone 20, 30 is that the weight of a motorized hydrocyclone 20, 30 can be significantly less than the weight of a solid bowl centrifuge capable of handling the same volumetric flow.

Typical solid bowl centrifuges capable of treating from about 10 gallons to about 300 gallons per minute usually weigh from about 2 to about 25 times that of a motorized hydrocyclone 20 or 30. Accordingly, for vehicle mounted applications as disclosed herein, system components having a reduced weight allow for higher payload carrying capacity and require less fuel to operate and transport. Furthermore, although the optimum position of the motorized hydrocyclone 20 or 30 is in a vertical position, as shown in FIGS. 3 and 4, it can be positioned at any orientation, such as vertical, horizontal or angled, within the mixed organic/aqueous compartment 3 due to a much lower rotating mass of liquids and solids.

In another embodiment, dissolved air flotation (DAF) systems (not shown) can be used in conjunction with the separator 10. DAF systems allow air or another gas to be dissolved into liquid under high pressure of, e.g., from about 60 to about 75 psi, thereby forming very small bubbles which attach to the organic phase and rise to the surface of the liquid with the bubbles of gas. Accordingly, the organic phase, including the organic phase present in emulsions with the aqueous phase, can be separated from the aqueous phase.

In yet another embodiment, sonic energy can be used in conjunction with the separator 10. The application of high-intensity vibrations to an emulsion or suspension changes the particle size distribution in favor of larger particles, which are more easily precipitated by gravitational forces or other conventional separation devices.

Once the low density organic liquids, solids and/or gases are separated from the high density aqueous liquids and/or solids, the aqueous phase can be conveyed to a separate location, e.g., stored in a separate container or directly discharged from the system. As shown in FIG. 1, the separator 10 can be housed within the mixed aqueous/organic compartment 3. In this embodiment, the separated organic phase is directed from the organic phase outlet 15 of the separator 10 back into the mixed organic/aqueous compartment 3 and the separated aqueous phase can be piped from the separator 10 into the separated aqueous compartment 2 by pipe 13. Alternatively, the separated organic phase can be piped to any desired vessel.

The aqueous phase may comprise some hydrophilic food particles and solids. The aqueous phase can be held within the separated aqueous compartment 2 until it can be discharged to a suitable receiving site such as a sewer, e.g., after a grease trap is cleaned or after multiple grease traps are cleaned. The separated aqueous compartment 2 comprises at least one aqueous phase inlet 41 to introduce the separated aqueous phase that is substantially free of immiscible fats, oils, and greases into the separated aqueous compartment 2. The aqueous phase inlet 41 may comprise any suitable valve. The separated aqueous compartment 2 also comprises at least one liquid outlet valve 42 positioned at a low area within the separated aqueous compartment 2 or as a dip pipe having an entrance at a low point and an outlet extending though a nozzle near the top of the separated aqueous compartment 2. For truck or other vehicle mounted applications, once the separation apparatus 1 has reached an appropriate disposal site, the separated aqueous phase may be passed from the separated aqueous container 2 through the aqueous phase outlet 42 and disposed in the sewer or other suitable repository.

Figure 5:
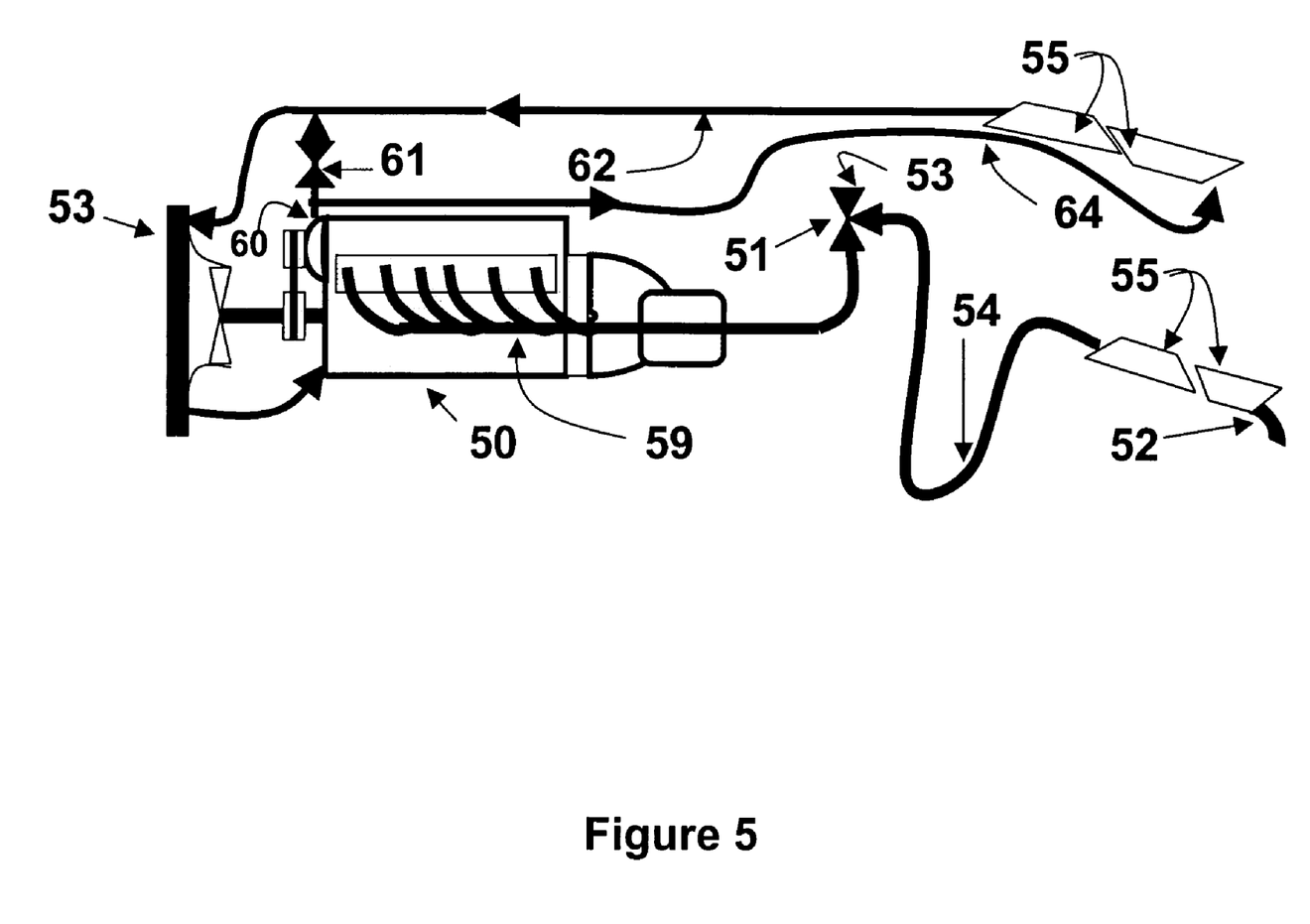
FIG. 5 is a partially schematic illustration of a wastewater heating system utilizing engine waste heat in accordance with an embodiment of the present invention.

In some embodiments, it will be desirable to heat the wastewater as it is introduced into or contained in the mixed organic/aqueous compartment 3. Heat can also be used to accelerate the breakdown of encapsulated gas pockets trapped in wastewater or emulsions. A heating device may also be used to facilitate the separation of the organic phase from the aqueous phase. Heating devices can comprise any suitable source of heat, such as electric heaters or gas-fired heaters, or a heat recovery system that utilizes waste heat from a vehicle upon which the system is mounted. As shown in FIGS. 1 and 5, a truck mounted mixed organic/aqueous compartment 3 can be heated by routing engine exhaust from the truck engine 50 and the exhaust manifold 59 through a valve 51 that diverts hot exhaust gas to the mixed organic/aqueous compartment 3 by heating a heat exchanger 55 in communication with the mixed organic/aqueous compartment 3 or to the exhaust pipe 52 via flow path 53. The direction the hot exhaust is routed is determined by the temperature of the contents of the mixed organic/aqueous compartment 3. Temperature can be determined by a temperature sensor 66 positioned at any desirable location.

As shown in FIG. 5, if the exhaust is directed to the mixed organic/aqueous compartment 3, it passes through a hot exhaust gas pipe 54 to at least one heat exchanger 55 such as a panel coil heat exchanger. The heat exchanger 55 can be mounted on the exterior walls of the mixed aqueous/organic compartment 3, such as under the external insulation of an insulated tank trailer 56. The heat exchanger 55 can also be positioned in contact with the wastewater contained in the mixed aqueous/organic compartment 3. In another embodiment, the heat exchanger can be positioned at another location, such as adjacent the separated aqueous compartment 2.

In another embodiment, the truck mounted mixed organic/aqueous compartment 3 is heated by routing the exhaust gases through a heat exchanger 55 that heats a heat exchange medium. This heat exchange medium is conveyed to a heat exchanger 55 mounted in the mixed aqueous/organic compartment 3 where it gives up its heat to the aqueous/organic compartment 3 contents. The heat exchange medium can be the engine coolant or an evaporating liquid that removes heat by evaporation and gives up heat by condensation. The heat exchanger 55 can be connected to an exhaust pipe 52 which discharges cooled exhaust gases and steam condensate saturated with carbon dioxide gas.

In another embodiment, as shown in FIG. 5, a valve 61 can divert water from the engine water pump 60 to the tank trailer mounted heat exchanger 55 via flow path 64 for contacting hot gases from the truck's water cooling system to the contents of the mixed aqueous/organic compartment 3. A cool engine coolant return line 62 can be provided to convey the cooled engine coolant from the heat exchanger 55 to the radiator 63 and subsequently back to the truck engine 50.

In another embodiment, exhaust gases from truck exhaust manifold can be directed directly from the hot exhaust pipe 54 into the mixed aqueous/organic compartment 3 though a trap that prevents fluids from entering the exhaust but allows the transmission of hot gases. These hot gasses then pass through the mixed organic/aqueous compartment 3. The sensible and latent heat of the exhaust is transferred directly to the contents of the mixed organic/aqueous compartment 3 and the exhaust is subsequently routed out of the compartment 3 through a gas/liquid trap that prevents any liquids from exiting the truck. Any system components exposed to the exhaust can be constructed of stainless steel or other material that is not corroded by exhaust gas.

In another embodiment, a direct-fired heater can be fueled from the truck engine fuel or an alternative fuel source, such as the waste oil or grease, or a compressed gas or liquid. The direct fired heater can transfer heat to the contents of the mixed organic/aqueous compartment 3 by routing the exhaust through the compartment 3, by routing the exhaust through a heat exchanger 55, or by routing the exhaust through a heat exchanger 55 which heats a heat exchange medium.

In another embodiment, a temperature controlled is added to the temperature sensor 66. A first thermostatic set point can allow the engine heat to be transferred to the contents of the mixed organic/aqueous compartment 3 through a heat exchanger 55 once a given elevated temperature set point is achieved in the mixed organic/aqueous compartment 3. The second thermostatic set point operating at a higher temperature can allow an amount of the engine's heat to be lost to the atmosphere through the radiator, thereby controlling both the upper limit of the temperature of the contents of the mixed organic/aqueous compartment 3 and the internal combustion engine.

In yet another embodiment, a heat exchanger 55 could be positioned at the discharge of pump 8. The heat exchanger 55 can be heated by hot exhaust gases, hot engine coolant fluids, by condensing hot gases or by direct fired heaters. The pump 8 can be set to recycle through the mixed organic/aqueous compartment 3 or to be directed to a centrifugal separation device 10.

In yet another embodiment, heat in the form of hot exhaust, gases, or liquids can be directed to the separator itself. As shown in FIG. 4, heat can be directed through a heat inlet port 91 and into an insulated jacket 93 which substantially surrounds or contact the separator, shown in FIG. 4 as hydrocyclone 30. Once the exhaust, gases or liquid has cooled, it can be directed out of the jacket 93 through heat outlet port 92.

When the wastewater originates from a grease trap, the wastewater entering the grease trap may be warm due to hot dish washing water flowing from drains to the grease trap. Maintaining this heat and/or increasing the temperature of the wastewater may improve the separation of the organic phase from the aqueous phase. The contents of the mixed organic/aqueous compartment can be heated to any desired level sufficient to allow separation of the organic phase and the aqueous phase, such as a temperature of from about 50° C. to about 80° C., typically from about 60° C. to about 70° C. Once the contents of the container reach this temperature, they may be fed through the centrifugal separation device 10. Typically, wastewater entering the centrifugal separation device 10 that has a temperature of at least about 60° C. separates more rapidly into the organic phase and the aqueous phase than wastewater having lower temperatures. The contents of the mixed organic/aqueous compartment 10 can be automatically fed to the centrifugal separation device 10 once the desired temperature is reached.

Figure 6:
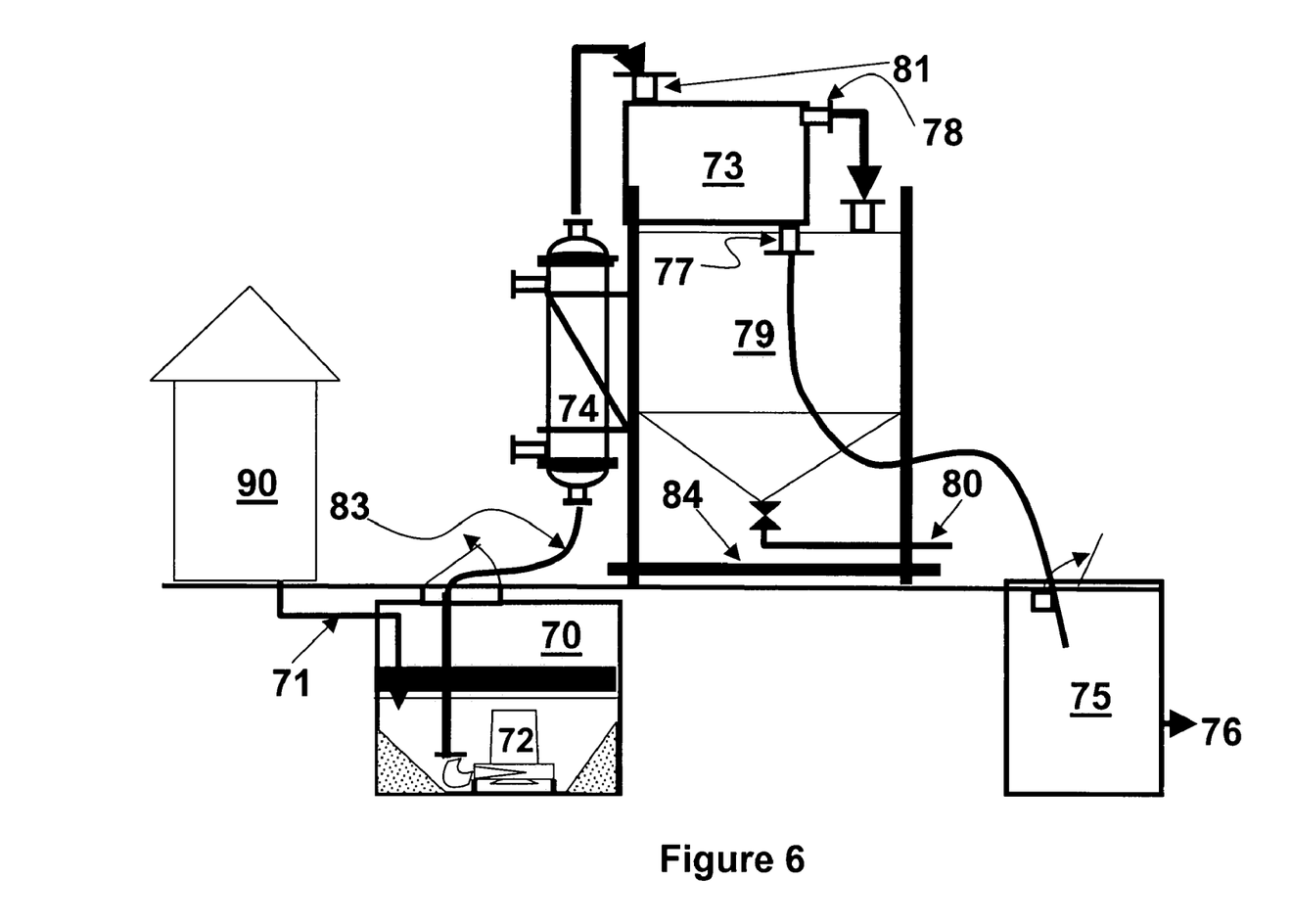
FIG. 6 is a partially schematic side sectional view of a wastewater separation system in accordance with an embodiment of the present invention.

An alternative embodiment of the present invention is shown in FIG. 6. In this embodiment, the system can be stationary or mounted on a skid for movement to various locations. As shown in FIG. 6, the source of wastewater 70 can comprise a grease trap. The wastewater source 70 may be fed from a facility 90, such as a food preparation facility, food packaging facility, school or restaurant. The source of wastewater 70, such as a grease trap, can comprise an inlet line 71 that allows contents from an entity 90 to enter the grease trap. The source of wastewater 70 can further comprise a pump 72 for breaking down large particulate and for directing the wastewater into the wastewater inlet 81 of a separator 73, such as a centrifugal separation device. The wastewater may optionally be heated by a heat exchanger 74 prior to entering the wastewater inlet 81 of a separator 73, such as a centrifugal separation device. The separator 73 comprises a wastewater inlet 81, an organic phase outlet 78, and an aqueous phase outlet 77. Separated organic phase material can be directed into and stored within compartment 79, such as an insulated stationary or portable tank from where it can be subsequently discharged to an appropriate waste hauler via valve 80. Separated aqueous phase material can be directed into a holding compartment 75 or directed to a drain or sewer 76. Platform 84 can be used by a moveable device, such as a skid, to move the system to various locations.

The following example is intended to illustrate various aspects of the present invention, and is not intended to limit the scope of the invention.

EXAMPLE

A portable tank with an empty mixed organic/aqueous compartment and an empty separated aqueous container is connected to a grease trap containing wastewater, and the process of emptying the grease trap is initiated. The total contents of the grease trap are pumped into the mixed organic/aqueous compartment that is housed on a truck bed. After the hoses have been disconnected and the mixed organic/aqueous compartment is sealed, a grinder pump is set to recycle and the contents of the mixed organic/aqueous container are heated to a temperature of from about 60° C. to about 70° C. Once the contents of the mixed organic/aqueous container reach the temperature of about 60° C. to about 70° C., a centrifugal separator is actuated and the discharge from the grinder pump is directed to the centrifugal separator. The centrifugal separator separates the aqueous phase from the organic phase of the wastewater and the aqueous phase is piped into the separated aqueous container where the contents are held until they can be discharged to a sewer or other appropriate disposal location.

The separated organic phase may have a specific gravity of about 0.89 at about 50° C. and a gross heating value of about 17,000 BTUs/pound. The separated organic phase is then discharged from the centrifugal separation device and directed to a heated storage tank for sales into the industrial market. The separated aqueous phase is then disposed into the sewer or held in a storage container for subsequent discharge.

If the tank contents are maintained at from about 60° C. to about 70° C., the contents of the tank can be separated into an organic phase that has a heat value of 90% of diesel fuel. For example, this can be accomplished by using a small diameter hydrocyclone fed at 70° C., 4 bar pressure, and discharging the organic phase at 0 bar pressure and the aqueous phase at 2 bar pressure. Alternately, a motorized hydrocyclone can be fed at 70° C. with an emulsified organic/aqueous stream to create internal separation forces that are more than 300 times the gravitational force. Separated organic phase can be rapidly processed into high heat content fuel for industrial furnaces such as direct fired kilns, asphalt batch plants, low speed industrial diesel engines and furnaces.

A separation system as disclosed herein has many benefits. For example, the separation system reduces the required transportation energy and operator time spent cleaning each grease trap, and greatly increases the number of grease traps cleaned and the amount of organic phase that can be collected and transported to a disposal site per transport container trip. Furthermore, a separation system that separates the organic phase from the aqueous phase of the wastewater while the separation apparatus is moved from one collection site to another, can increase the amount of organic phase collected per unit volume by up to about eight times that of current operations. This can improve the productivity of the transportation equipment, operator time, and reduce fuel consumption required for transportation. It can also simplify the handling of the organic phase at the disposal site where trucks typically discharge a waxy, solidified fat, oil and grease mixture from cold tanks that require a significantly longer time and much effort to separate it from the aqueous layer and food solids that are contained in the emulsified organic layer.

Whereas particular embodiments of this invention have been described above for purposes of illustration, it will be evident to those skilled in the art that numerous variations of the details of the present invention may be made without departing from the invention.

What is claimed is:

1. A portable system for separating an aqueous phase from an organic phase comprising oil, fat, grease and/or surfactant in wastewater while in transit, the system comprising:
   a wastewater container;
   a separator comprising:
      a wastewater inlet in fluid communication with the wastewater container,
      an aqueous phase outlet for concentrating at least some of the aqueous phase from the wastewater, and
      an organic phase outlet for concentrating at least some of the organic phase from the wastewater; and
   means for heating the wastewater prior to flow of the wastewater into the separator while the system is in transit.

2. The system of claim 1, wherein the organic phase outlet is in fluid communication with the wastewater container.

3. The system of claim 1, further comprising an aqueous phase container in fluid communication with the aqueous phase outlet of the separator.

4. The system of claim 1, wherein the separator comprises a centrifugal separator.

5. The system of claim 4, wherein the centrifugal separator comprises a motorized hydrocyclone.

6. The system of claim 4, wherein the centrifugal separator comprises a stationary casing with a rotatable impeller disposed therein.

7. The system of claim 1, further comprising a wastewater pump in flow communication with the inlet of the separator.

8. The system of claim 7, wherein the wastewater pump is a grinder pump.

9. The system of claim 7, wherein the wastewater pump is positioned in the wastewater container.

10. The system of claim 1, further comprising a wastewater source connected to the wastewater inlet.

11. The system of claim 10, wherein the wastewater source is a grease trap.

12. The system of claim 1, wherein the system is mounted on a vehicle.

13. The system of claim 12, wherein the means for heating the wastewater utilizes waste heat from the vehicle.

14. The system of claim 12, wherein the means for heating the wastewater utilizes heat from a cooling system of the vehicle.

15. A method for separating an aqueous phase from an organic phase comprising oil, fat, grease and/or surfactant in wastewater while in transit, the method comprising:
heating the wastewater while in transit;
providing the heated wastewater to a separator;
concentrating at least a portion of the aqueous phase to produce a concentrated aqueous phase;
concentrating at least a portion of the organic phase to produce a concentrated organic phase;
removing at least a portion of the concentrated aqueous phase from the separator; and
removing at least a portion of the concentrated organic phase from the separator.

16. The system of claim 1, wherein the means for heating the wastewater heats the wastewater to a controlled temperature above 50° C.

* * * * *